UNITED STATES PATENT OFFICE.

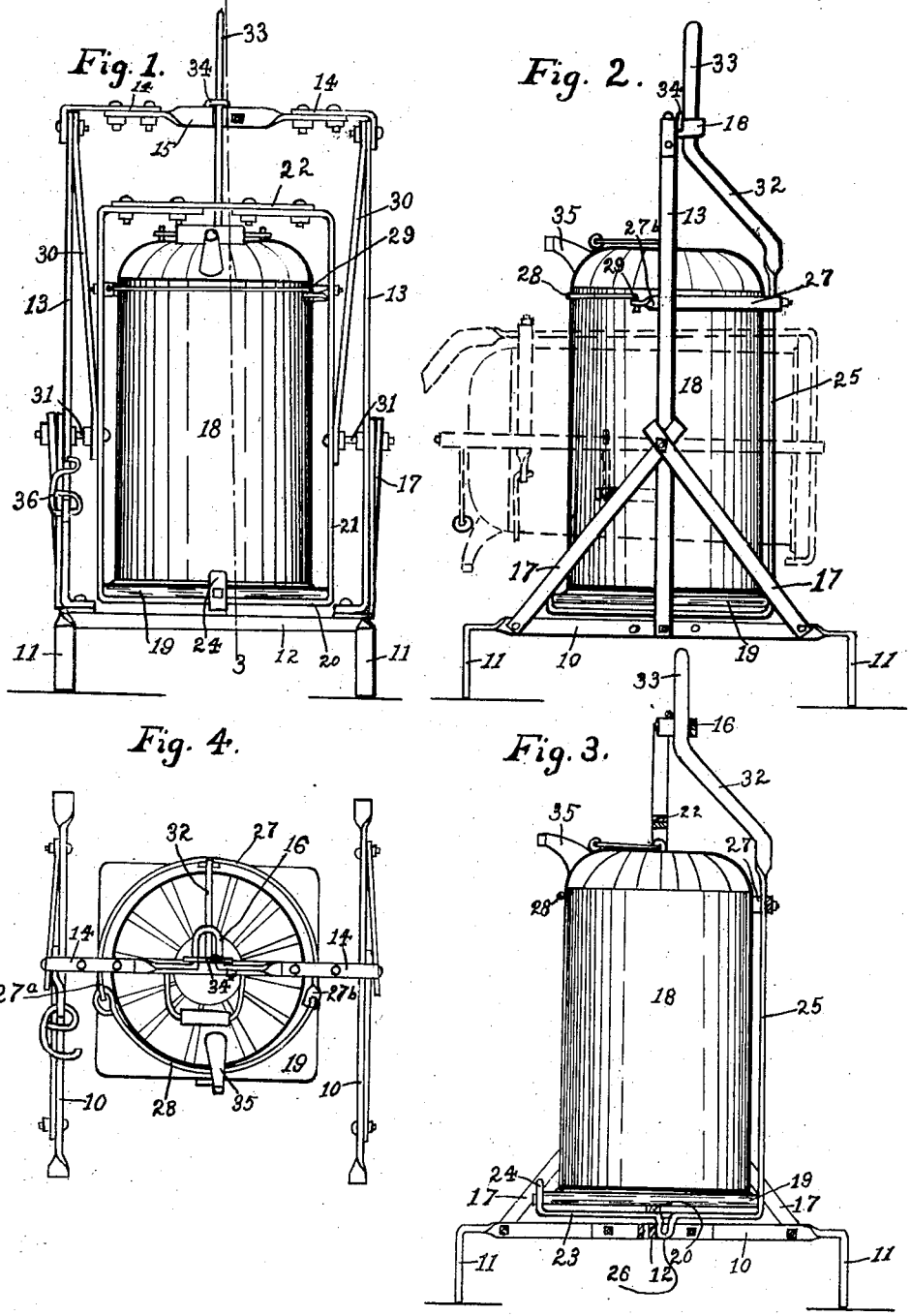

EPHRIAM H. NELSON, OF YALE, IOWA.

TANK-RACK.

1,351,923.   Specification of Letters Patent.   Patented Sept. 7, 1920.

Application filed February 28, 1920. Serial No. 361,987.

*To all whom it may concern:*

Be it known that I, EPHRIAM H. NELSON, a citizen of the United States, and resident of Yale, in the county of Guthrie and State of Iowa, have invented a certain new and useful Tank-Rack, of which the following is a specification.

The object of my invention is to provide a tank rack of simple and inexpensive construction, adapted for supporting a gasolene tank or the like in such manner that the tank can be readily held upright or tilted to position for discharging the contents thereof, with a minimum of effort on the part of the user.

With this and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a front elevation of a tank rack embodying my invention, illustrating a tank installed thereon.

Fig. 2 shows a side elevation of the same, the dotted lines showing the tank in its tilted position.

Fig. 3 shows a vertical sectional view, taken on the line 3—3 of Fig. 1; and

Fig. 4 shows a top or plan view of the structure.

In the accompanying drawings I have used the reference numeral 10 to indicate generally two spaced fore-and-aft extending frame members, having at their ends supporting legs 11. The frame members 10 are connected by a transverse frame member 12.

Extending upwardly from the central portions of the respective frame members 11 are upright side members 13. The side members 13 are connected at their upper ends by horizontal members 14 and 15. The horizontal member 15 comprises a strap or bar of iron, having at its central portion a horizontal U-shaped socket 16. On each side of the frame the upright member 13 is braced by a pair of braces 17, extending downwardly and to the members 10, near the ends thereof.

For supporting the tank 18 I have provided a swinging frame comprising a bottom member 19. Beneath the bottom member 19 is a transverse frame member 20, having at its ends upwardly extending frame members 21. The members 21 are connected at their upper ends by a transverse frame member 22. Beneath the bottom 19 is a fore-and-aft extending frame member 23, having at its forward end an upward extension 24 forming a stop for holding the tank on the bottom 19, and having at its rear end an upwardly extending member 25.

The member 23 is provided, spaced from its ends, with a stop device 26, adapted to coact with the transverse frame member 12 for limiting the swinging movement of the tank holding frame.

The uprights 13 and the upright 25 are connected near the upper end of the tank 18 by a semi-circular frame member 27, which has portions projecting forwardly a short distance from the uprights 13, as shown at 27ª and 27ᵇ. Pivoted to the portion 27ª, as shown in Fig. 4, is a curved wire or rod 28, having at its free end a hook member 29 adapted to enter a suitable hole in the member 27ᵇ, and adapted in coaction with the frame member 27 to form a ring for encircling and holding the upper end of the tank.

It will be noted that the members 20, 21 and 22 form a sort of rectangular frame having the tank supporting bottom 19 at its lower end, and a tank encircling ring composed of the members 27 and 28 at its upper end and forming a complete swinging tank holding frame.

This tank holding frame is supported on the uprights 13 in the following manner:

Bolted to the upper portions of the uprights 13 are the upper ends of hangers 30, which extend downwardly as illustrated, for instance, in Fig. 1. Extended through the upper ends of the braces 17 at each side of the main frame, and through the member 13, then through the lower end of the adjacent hanger 30, then through the adjacent frame member 21, is a bolt or the like 31 forming a spindle on which the tank holding frame is pivotally supported on the main frame. It will be understood that there is one of these bolts at each side of the device.

Extending upwardly from the upper end of the member 25 and the rear central portion of the member 27, when the parts are in position for holding the tank upright, is a lever 32, having at its upper portion a handle 33 which is arranged to be received in the socket 16 and to be held therein by a movable, downwardly opening, U-shaped fastening member 34.

In the practical use of my improved tank rack the tank 18 is placed on the bottom 19 when the tank is empty. It will be seen that the upright frame members 21 and 25 prevent any lateral or rearward sliding movement of the tank in its movable frame, and the extension 24 and the member 28 hold the tank against movement forwardly out of its movable frame. It will, of course, be understood that in installing the tank in position, the member 28 is unfastened, and as soon as the tank is in position in the movable frame the member 28 is placed in position with the hook member 29 received in the hole in the end 27ᵇ of the frame member 27. When the tank is upright the handle 33 is received in the socket 16 and is locked by means of the member 34, the arms of which are extended downwardly, as shown, for instance, in Figs. 1, 2 and 4. The tank 18 can be filled in the ordinary way.

The cross member 22 of the movable frame is arranged to be high enough above the tank to permit access to the top of the tank for filling it. The tank is ordinarily arranged with its spout 35 forwardly.

When it is desired to discharge some of the contents of the tank, the fastening device 34 is removed and the handle 33 may be grasped for swinging the tank from its upright position toward position for discharging its contents through the spout. In Fig. 2 I have shown the tank tilted to substantially horizontal position for discharging all of its contents.

On account of the manner in which the tank is balanced, it will be seen that it may be very readily and easily tilted with a minimum expenditure of effort for discharging its contents.

I have provided a hook member 36, pivoted to one of the uprights 13, which may be used to engage one of the frame members 21 for holding the tank in one of its tilted movements.

The advantage of a tank rack of the general type herein described, which will support a tank in such a way that it may be rigidly held in upright position for filling and when not in use, and which will permit the easy tilting of the tank for pouring out its contents, is obvious.

Many of these tanks are quite heavy, and especially for private garage purposes the expense of putting in pump equipment is so considerable as to be prohibitive. It will be noted that my improved tank rack is of very simple and relatively inexpensive construction. Its plan of structure is such that it is very easy to make different sizes of the racks to use with different sizes of tanks.

Particular attention is called to the construction and arrangement of the supporting frames. It will be noted that the main fixed frame is in the form of a rectangle, with the uprights braced by the members 17, and that the swinging frame is also in the form of a rectangle, supported at the proper points on the hanger members 30, and also supported on the uprights 13 and braces 17 so as to afford a very strong and rigid support for the spindles on which the movable frame turns.

Some changes may be made in the construction and arrangement of the various parts of my improved device without departing from the essential purposes and features of my invention, and it is my intention to cover by my claims any modified forms of structure or use of mechanical equivalents which may be reasonably included within their scope.

I claim as my invention:

1. In a device of the class described, a fixed upright frame substantially rectangular in outline, a substantially rectangular movable frame, hangers connected with the upper parts of the upright members of the fixed frame, and extending downwardly within the outline of the fixed frame, spindles mounted in said movable frame and in the lower ends of said hangers, and in the upright members of said fixed frame, for pivotally supporting the movable frame between its ends, a bottom on the movable frame, and means for locking the movable frame in upright position.

2. In a device of the class described, a fixed upright frame substantially rectangular in outline, a substantially rectangular movable frame, hangers connected with the upper parts of the upright members of the fixed frame, and extending downwardly within the outline of the fixed frame, spindles mounted in said movable frame, and in the lower ends of said hangers, and in the upright members of said fixed frame, for pivotally supporting the movable frame between its ends, a bottom on the movable frame, and means at the upper end of the movable frame when in upright position, for encircling the upper portion of the tank, said means including a movable member, a handle on said movable frame, and means for locking said handle to said fixed frame.

3. In a device of the class described, a fixed upright frame substantially rectangular in outline, a substantially rectangular movable frame, hangers connected with the upper parts of the upright members of the fixed frame, and extending downwardly within the outline of the fixed frame, spindles mounted in said movable frame, and in the lower ends of said hangers, and in the upright members of said fixed frame, for pivotally supporting the movable frame between its ends, a bottom on the movable frame, means at the upper end of the movable frame when in upright position, for encircling the upper portion of the tank, said means including a movable member, a handle on said movable frame, and means for locking said handle to said fixed frame, and means for preventing sliding movement of the tank forwardly or rearwardly with relation to said movable frame when assembled therein.

Des Moines, Iowa, February 4, 1920.

EPHRIAM H. NELSON.